United States Patent
Amagasa (10) Patent No.: US 7,486,038 B2
(45) Date of Patent: Feb. 3, 2009

(54) MOTOR CONTROL METHOD AND MOTOR CONTROL SYSTEM

(75) Inventor: Toshiyuki Amagasa, Kiryu (JP)

(73) Assignee: Mitsuba Corporation, Gunma (JP)

(*) Notice: Subject to any disclaimer, the term of this patent is extended or adjusted under 35 U.S.C. 154(b) by 88 days.

(21) Appl. No.: 11/667,104

(22) PCT Filed: Nov. 10, 2005

(86) PCT No.: PCT/JP2005/020577
§ 371 (c)(1),
(2), (4) Date: May 4, 2007

(87) PCT Pub. No.: WO2006/051837
PCT Pub. Date: May 18, 2006

(65) Prior Publication Data
US 2008/0100244 A1    May 1, 2008

(30) Foreign Application Priority Data
Nov. 11, 2004  (JP) .................. 2004-327299

(51) Int. Cl.
*H02H 7/08* (2006.01)
(52) U.S. Cl. ............... 318/400.21; 318/599; 388/804
(58) Field of Classification Search ........... 318/599, 318/400.21, 400.22; 388/804, 811, 819
See application file for complete search history.

(56) References Cited
U.S. PATENT DOCUMENTS
2007/0171250 A1* 7/2007 Tanaka et al. ............... 347/19

FOREIGN PATENT DOCUMENTS

| JP | 06-004418 | 1/1994 |
|---|---|---|
| JP | 07-039062 | 2/1995 |
| JP | 11-122703 | 4/1999 |
| JP | 11-252979 | 9/1999 |
| JP | 2001-095286 | 4/2001 |

OTHER PUBLICATIONS

International Preliminary Report on Patentability and Written Opinion of the International Searching Authority issued Jun. 26, 2007 in International (PCT) Application No. PCT/JP2005/020577 of which the present application is the U.S. National Stage.

* cited by examiner

*Primary Examiner*—Karen Masih
(74) *Attorney, Agent, or Firm*—Wenderoth, Lind & Ponack, L.L.P.

(57) ABSTRACT

In a PWM-controlled motor, a motor rotation frequency f, lock determination frequency d, and power supply voltage E are acquired (S1 to S3). The d is compared to the f (S4). When f is not less than that of d, Max.Duty is calculated by the following equation for setting: Max.Duty=D0*Kf (S5, S6). D0 is an allowable Duty value and can be calculated by [DP0=a−bE] (a: fixed Duty value, b: Duty characteristic coefficient). Kf is a frequency adjustment coefficient. Kf corrects the allowable Duty value D0 in accordance with the motor rotation frequency f and can be calculated by the following equation: Kf=1+(f−d)/c (c: restriction start frequency, d: lock determination frequency). When f is less than d, Max.Duty=D0 is set (S7, S6). When the motor enters a locked state, the Duty value is suppressed to not more than the allowable Duty value D0 to thereby suppress a lock current. This reduces a lock current at low temperature time to prevent demagnetization of a magnet as well as reduces a load of a switching device.

14 Claims, 4 Drawing Sheets

14.0 V or less : Max Duty = 65.0%

[FIG. 4]

Max Duty = D0 * Kf
D0 = a−b*E ; Kf = 1+(f−d)/c
a = 135 ; c = 860

Max. duty (%)

| Power supply voltage [V] | Frequency [Hz] | | | | | | |
|---|---|---|---|---|---|---|---|
| | 0 | 100 | 200 | 300 | 400 | 500 | 600 |
| 15.0 or less | 60 | 67 | 74 | 81 | 88 | 95 | 102 |
| 14.5 or less | 63 | 70 | 77 | 84 | 92 | 99 | 106 |
| 14.0 or less | 65 | 73 | 80 | 88 | 95 | 103 | 110 |
| 13.5 or less | 68 | 75 | 83 | 91 | 99 | 107 | 115 |
| 13.0 or less | 70 | 78 | 86 | 94 | 103 | 111 | 119 |
| 12.5 or less | 73 | 81 | 89 | 98 | 106 | 115 | 123 |
| 12.0 or less | 75 | 84 | 92 | 101 | 110 | 119 | 127 |
| 11.5 or less | 78 | 87 | 96 | 105 | 114 | 123 | 132 |
| 11.0 or less | 80 | 89 | 99 | 108 | 117 | 127 | 136 |

MOTOR CONTROL METHOD AND MOTOR CONTROL SYSTEM

TECHNICAL FIELD

The present invention relates to a control method for a motor used in a wiper system of a vehicle and, more particularly, to a motor control method/system capable of suppressing demagnetization of a field magnet, which is caused by a lock current under a low temperature environment.

BACKGROUND ART

An electromagnetic motor provided with a field magnetic (permanent magnet) has been in heavy usage in a wiper system of a vehicle as a drive source of the wiper system. Such a motor is used even under a low temperature range of about −40° C. depending on the use condition of a vehicle or the like and, therefore, is required to operate normally even under the low temperature environment. That is, the motor is required to be activated without difficulty from a low temperature state in which the motor is almost frozen and to allow a wiper or the like to operate in the same way as at room temperature.

However, the motor is kept under a low temperature environment, the resistance of a copper wire serving as an armature winding becomes smaller, so that a current easily flows to the winding. Accordingly, when the motor may become overloaded under a low temperature environment and locked, a winding current (lock current) becomes significantly large, with the result that the field magnet is easily demagnetized. For example, when a swinging wiper arm is brought into contact with an obstacle such as snow existing near its lower reverse position to allow the motor to be in a locked state immediately after the motor is activated under a low temperature environment, a lock current increases, with the result that the field magnet may be demagnetized. Especially, in the case of a ferrite series magnet, the coercivity of the field magnet itself is easily lowered at low temperature time, so that demagnetization under a low temperature environment becomes increasingly prominent. When the magnet is demagnetized, not only is the motor output decreased but also there is a possibility that it becomes impossible to obtain desired motor characteristics even if ambient temperature is brought back to room temperature.

Patent Document 1: Jpn. Pat. Appln. Laid-Open Publication No. 7-39062

Patent Document 2: Jpn. Pat. Appln. Laid-Open Publication No. 11-122703

DISCLOSURE OF INVENTION

Problems to be Solved by the Invention

In light of the above, a motor that may be used under a low temperature environment needs to use a magnet having high coercivity or having an increased thickness in order to prevent the magnet from being demagnetized. However, a magnet having high coercivity is expensive and production cost is correspondingly increased. Further, the increased thickness results in an increase in size and weight of the entire motor.

Further, an increased winding current makes it necessary for a motor drive circuit to use an expensive switching device having high current capacity in order to meet the requirements of a motor lock current. In particular, in the case where a motor of a high torque and high speed rotation is driven, a switching device having higher current capacity becomes required to increase cost of the switching device, thus resulting in an increase in production cost.

An object of the present invention is to reduce a lock current at low temperature time to suppress demagnetization of a magnet to thereby reduce cost and thickness of the magnet for a reduction in production cost and size and weight of the motor. Another object of the present invention is to reduce a load of a switching device for use in a motor drive circuit by suppressing a lock current to thereby enable a use of a low cost device for a reduction in production cost.

Means for Solving the Problems

According to the present invention, there is provided a motor control method that applies a voltage having a pulse-like waveform including on-time and off-time and changes on/off time ratio of the voltage to change an actual applied voltage, characterized by comprising: setting, based on the allowable current amount of the motor, an allowable Duty value representing the maximum value of on-time ratio of the voltage that can be applied to the motor when the motor enters in a locked state with a power supply voltage set as a variable; detecting the number of rotations of the motor and the power supply voltage; and suppressing, based on the detected power supply voltage, the on-time ratio of the applied voltage to not more than the allowable Duty value when the number of rotations of the motor becomes not more than a first reference value.

In the present invention, in a so-called PWM controlled motor, when the number of rotations of the motor becomes not more than a first reference value and thereby the motor is determined to enter a locked state or a state in which it is possible to determine so, the Duty of an applied voltage is suppressed to not more than a predetermined allowable Duty value based on a power supply voltage. In this case, the allowable Duty value is set in accordance with characteristics of each motor based on the allowable maximum lock current value and is changed depending on the magnitude of the power supply voltage. Then, a value in which demagnetization of a magnet can be suppressed within an allowable range is set as the allowable maximum lock current value and, when the motor is determined to enter a locked state or a state in which it is possible to determine so and the Duty value is suppressed to not more than the allowable Duty value, a current amount is suppressed within the demagnetization allowable range, thereby suppressing demagnetization of the magnet.

In the motor control method, when the number of rotations of the motor has exceeded the first reference value, the allowable Duty value may be corrected based on the number of rotations of the motor, and the on-time ratio of the applied voltage may be suppressed to not more than the corrected allowable Duty value based on the detected power supply voltage. This configuration allows the allowable Duty value to be suppressed in a wide range of the motor rotation number to thereby suppress an overcurrent at the time of motor lock more effectively. In this case, the correction of the allowable Duty value based on the number of rotations of the motor may be executed when the number of rotations of the motor becomes not more than a second reference value.

In the motor control method, the temperature or ambient temperature of the motor may be detected, and the allowable Duty value may be corrected based on a detected temperature value. This configuration allows the Duty value to be suppressed in accordance with the actual condition such as the motor temperature and the like to thereby achieve more accurate motor drive control.

In the motor control method, a configuration may be adopted in which the suppression of the on-time ratio of the applied voltage is not executed during acceleration of the motor. As a result, the Duty value is not suppressed during acceleration of the motor, thereby achieving smooth acceleration operation.

Further, according to the present invention, there is provided a motor control system that applies a voltage having a pulse-like waveform including on-time and off-time and changes on/off time ratio of the voltage to change an actual applied voltage for motor drive control, characterized by comprising: a rotation number detecting means for outputting a pulse signal in synchronization with the rotation of the motor; a voltage sensor for detecting a power supply voltage; a storage means for storing an allowable Duty value, the allowable Duty value being set based on the allowable current amount of the motor with a power supply voltage set as a variable and representing the maximum value of on-time ratio of the voltage that can be applied to the motor when the motor enters in a locked state; and a current restricting means for suppressing, based on the detected power supply voltage, the on-time ratio of the applied voltage to not more than the allowable Duty value when the frequency of the pulse signal becomes not more than a first reference frequency.

In the present invention, in a so-called PWM controlled motor, when the frequency of the pulse signal output from the rotation number detection means becomes not more than a first reference value and thereby the motor is determined to enter a locked state or a state in which it is possible to determine so, the Duty of an applied voltage is suppressed to not more than a predetermined allowable Duty value based on a power supply voltage. In this case, the allowable Duty value is set in accordance with characteristics of each motor based on the allowable maximum lock current value and is changed depending on the magnitude of the power supply voltage. Then, a value in which demagnetization of a magnet can be suppressed within an allowable range is set as the allowable maximum lock current value and, when the motor is determined to enter a locked state or a state in which it is possible to determine so and the Duty value is suppressed to not more than the allowable Duty value, a current amount is suppressed within the demagnetization allowable range, thereby suppressing demagnetization of the magnet.

In the motor control system, a temperature sensor that detects the temperature or ambient temperature of the motor may be provided in the system. In this case, the current restricting means may correct the allowable Duty value based on a detected temperature value. This configuration allows the Duty value to be suppressed in accordance with the actual condition such as the motor temperature and the like to thereby achieve more accurate motor drive control.

Advantages of the Invention

According to the motor control method of the present invention, in a so-called PWM-controlled motor, an allowable Duty value representing the maximum value of PWM Duty that can be applied at the time of motor lock is set based on the allowable current value of the motor with a power supply voltage set as a variable and, when the number of rotations of the motor becomes not more than a first reference value, the PWM Duty is suppressed to not more than the allowable Duty value based on a power supply voltage. Thus, when the motor is determined to enter a locked state or a state in which it is possible to determine so, the Duty of an applied voltage can be suppressed to not more than an optimum allowable Duty value based on a power supply voltage, with the result that even when the motor enters a locked state due to influence of an obstacle such as snow under a low temperature environment, it is possible to suppress a lock current flowing to an armature of the motor. This makes it possible to prevent demagnetization of the magnet under a low temperature environment and thereby, correspondingly, to reduce the grade of a magnet to be used and to reduce the thickness thereof. As a result, it is possible to use a low cost magnet to thereby reduce apparatus cost as well as to reduce the size and weight of the motor. Further, an excessive lock current does not flow to a control circuit or drive circuit, so that it is possible to prevent an excessive load from being applied to a switching device used there. This allows a use of a low cost switching device having low current capacity. Therefore, it is possible to reduce circuit cost.

According to the motor control system of the present invention, in a so-called PWM-controlled motor, there is provided a rotation number detecting means for outputting a pulse signal in synchronization with the rotation of the motor, a voltage sensor for detecting a power supply voltage, a storage means for storing an allowable Duty value, the allowable Duty value being set based on the allowable current amount of the motor with a power supply voltage set as a variable and representing the maximum value of PWM Duty that can be applied when the motor enters in a locked state, and a current restricting means for suppressing, based on the power supply voltage, the PWM Duty to not more than the allowable Duty value when the frequency of the pulse signal becomes not more than a first reference frequency. Thus, when the motor is determined to enter a locked state or a state in which it is possible to determine so, the Duty of an applied voltage can be suppressed to not more than an optimum allowable Duty value based on a power supply voltage, with the result that even when the motor enters a locked state due to influence of an obstacle such as snow under a low temperature environment, it is possible to suppress a lock current flowing to an armature of the motor. This makes it possible to prevent demagnetization of the magnet under a low temperature environment and thereby, correspondingly, to reduce the grade of a magnet to be used and to reduce the thickness thereof. As a result, it is possible to use a low cost magnet to thereby reduce apparatus cost as well as to reduce the size and weight of the motor. Further, an excessive lock current does not flow to a control circuit or drive circuit, so that it is possible to prevent an excessive load from being applied to a switching device used there. This allows a use of a low cost switching device having low current capacity. Therefore, it is possible to reduce circuit cost.

EXPLANATION OF REFERENCE SYMBOLS

1: motor
2: battery
3: CPU
4: rotation number detecting means
5: drive output circuit
6: voltage sensor
7: temperature sensor
8: current restricting means
9: ROM
10: control map
D0: allowable duty value
Kf: frequency adjustment coefficient
Kt: temperature correction coefficient
E: power supply voltage
a: fixed Duty value
b: Duty characteristic coefficient
c: restriction start frequency
d: lock determination frequency
f: motor rotation frequency
g: temperature base value
h: temperature coefficient
j: motor temperature

BEST MODE FOR CARRYING OUT THE INVENTION

Embodiments of the present invention will be described in detail below with reference to the accompanying drawings.

First Embodiment

Figure 1:
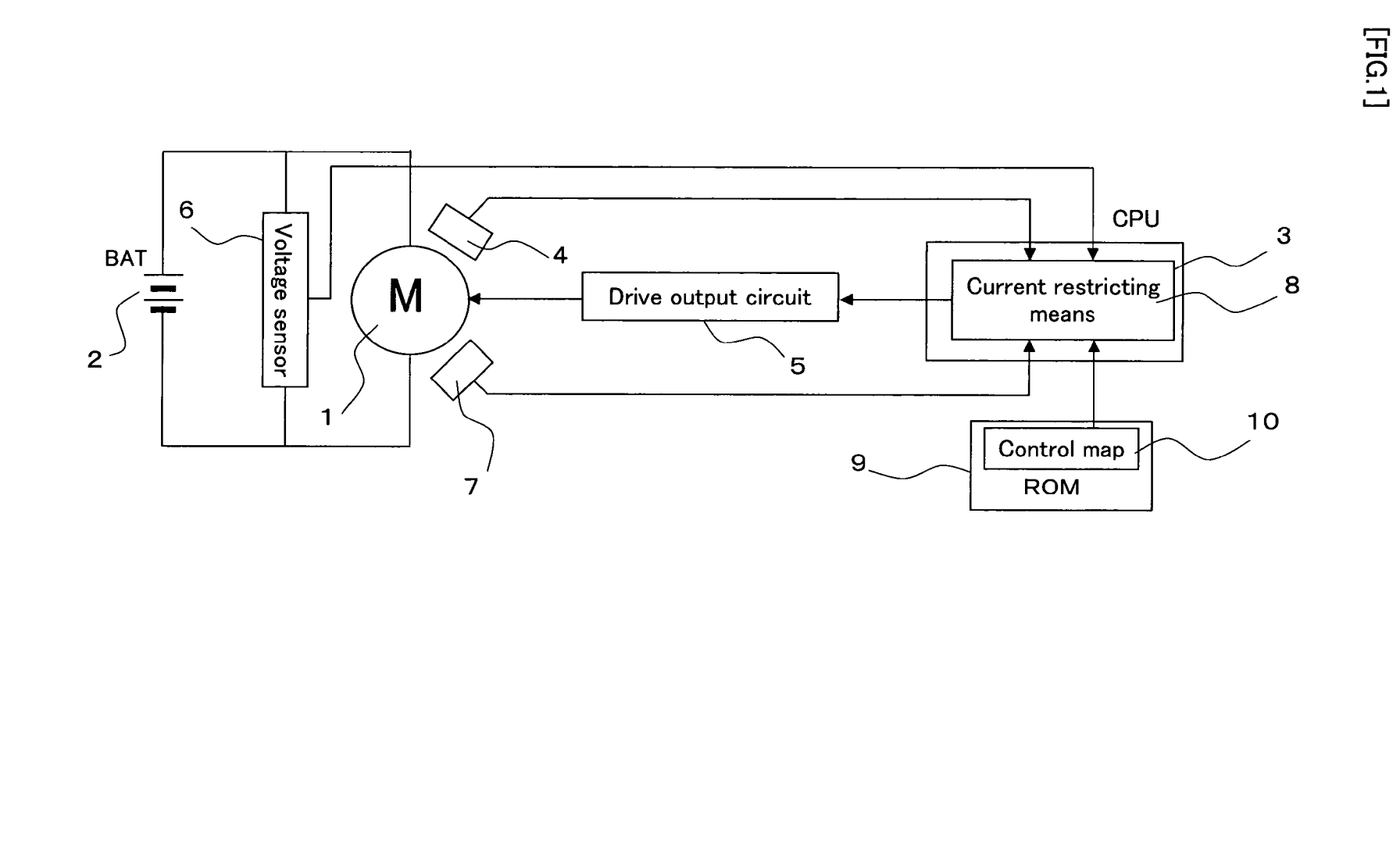
FIG. 1 is a block diagram showing a configuration of a motor control system to which a motor control method of a first embodiment of the present invention is applied.

FIG. 1 is a block diagram showing a configuration of a motor control system to which a motor control method of a first embodiment of the present invention is applied. A motor 1 shown in FIG. 1, which is used as a drive source of a wiper system of a vehicle, receives a power supply from a battery 2 and is drive-controlled by a CPU 3. The motor 1 has a rotation speed detecting means 4 which uses a hall IC. The speed (number of rotations) of the motor 1 can be detected by the frequency (motor rotation frequency) of a pulse signal output from the rotation speed detecting means 4.

The CPU 3 feedback-controls the motor 1 based on the number of rotations thereof calculated from the pulse signal. More specifically, the CPU 3 performs, for the motor 1, a PWM (Pulse Width Modulation) control in which ON/OFF ratio of the pulse width of applied voltage is changed to achieve drive control. In the PWM control, the CPU 3 turns ON and OFF a power supply voltage to change the actual applied voltage to thereby control the amount of a current to be supplied to the motor 1. Further, in the PWM control, the CPU 3 sets the Duty of the pulse voltage during ON period and transmits a control signal to a drive output circuit 5. Upon receiving the control signal, the drive output circuit 5 applies a pulse voltage having the set Duty to the motor 1. As a result, the number of rotations of the motor 1 is appropriately controlled.

A voltage sensor 6 is connected to the battery 2. The voltage sensor 6 detects a power supply voltage applied to the motor 1 and transmits the detected value to the CPU 3. Further, a temperature sensor 7 for detecting the temperature inside the motor 1, in particular, the temperature of an armature winding is provided inside the motor 1. The temperature sensor 7 is also connected to the CPU 3, and the temperature inside the motor 1 detected by the temperature sensor 7 is transmitted to the CPU 3 as motor temperature information. The CPU 3 performs constant monitoring of the temperature inside the motor 1 by using the temperature information.

A current restricting means 8 is provided in the CPU 3. The current restricting means 8 controls the drive output circuit 5 based on the power supply voltage, motor rotation frequency, motor temperature information, and the like so that a current value does not exceed a predetermined value at the time of motor lock. At this time, the current restricting means 8 restricts PWM Max Duty of the motor 1 with reference to a control map 10 and the like stored in a ROM (storage means) 9 to thereby suppress a motor supply current.

Figure 2:
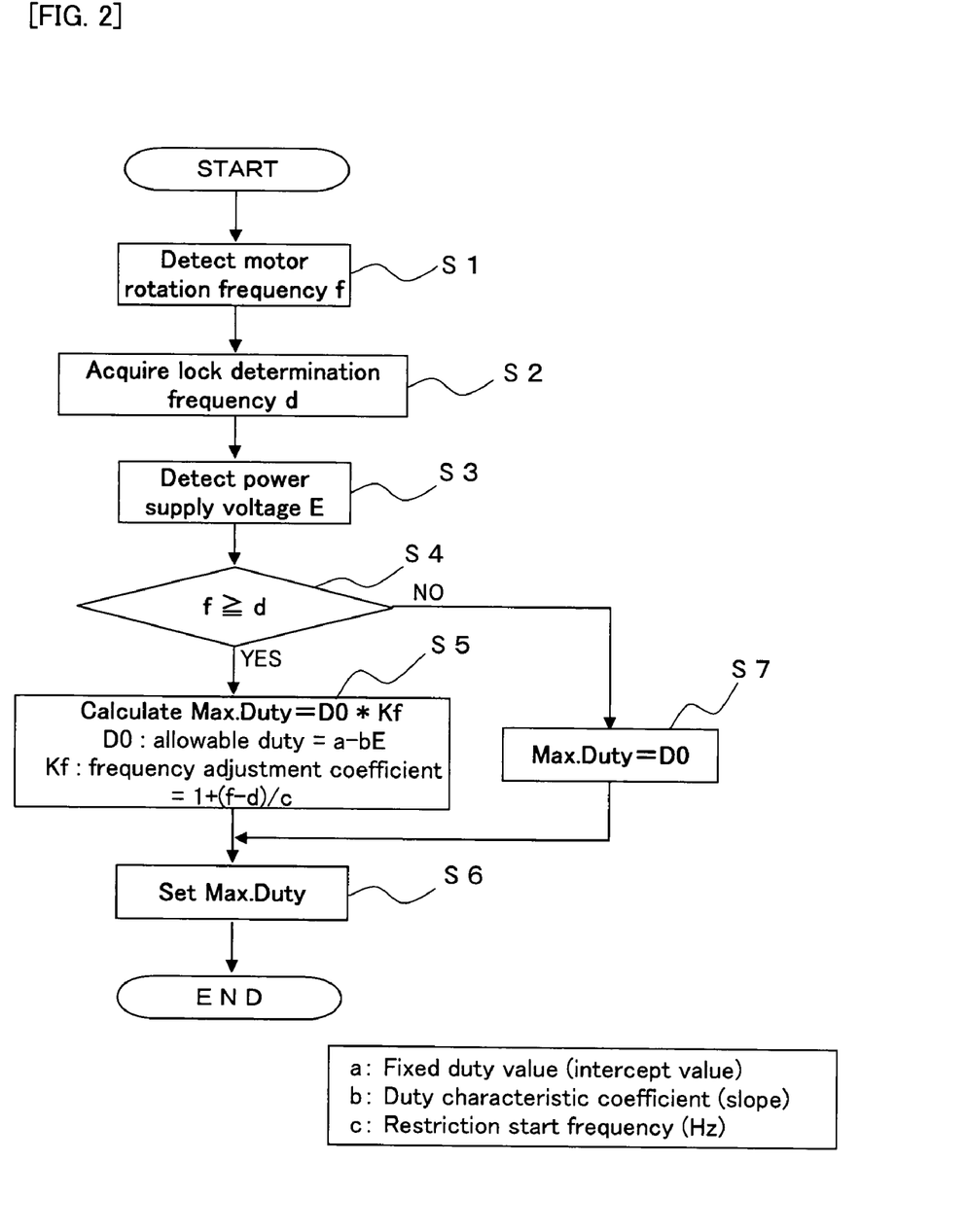
FIG. 2 is a flowchart showing the processing procedure of the motor drive control according to the first embodiment of the present invention.

FIG. 2 is a flowchart showing the processing procedure of the motor drive control according to the first embodiment. The motor drive control of FIG. 2 is executed in the system shown in FIG. 1. When an ignition key of a vehicle is turned ON, the processing of FIG. 2 is started.

In step S1, as shown in FIG. 2, a motor rotation frequency f is detected. The frequency of an output pulse signal of the rotation number detecting means 4 is used as the motor rotation frequency f. The output pulse signal is output in synchronization with the rotation of the motor 1. This allows the current number of rotations of the motor 1 or rotation state thereof to be grasped. The rotation number detecting means 4 outputs 12 pulses per one motor rotation. Assuming that the output pulse is 200 Hz, the number of rotations of the motor 1 is about 1,000 rpm. Since there is one-to-one correspondence between the frequency of the output pulse and motor rotation number, the frequency of the output pulse is treated as the motor rotation number in the present embodiment, and the motor rotation frequency f is directly used to perform the drive control of the motor 1.

In step S2, a lock determination frequency d (first reference frequency (which corresponds to a first reference rotation number in relationship with the motor rotation number)) is acquired. The lock determination frequency d, which is stored in the ROM 9, is a numerical value serving as a criterion to determine "locked state". Assuming that the lock determination frequency d is set to, e.g., 200, the motor 1 is determined to be in a locked state when the motor rotation frequency thereof becomes 200 Hz. The value of d is appropriately set within a range of about 0 to 400 depending on the motor characteristics or degree/type of a load.

In step S3, a power supply voltage E is detected. The power supply voltage E is detected by the voltage sensor 6, and a voltage currently applied to the motor 1 by the battery 2 is detected. The higher the power supply voltage is, the smaller a motor Duty corresponding to a given allowable current value becomes. Therefore, the voltage value of the battery 2 is detected also in this control method and is used as one of control parameters. Note that execution order among the above steps S1 to S3 is not limited to one described above, and any of the above steps S1 to S3 may be executed first.

After the f, d, E have been set and detected in steps S1 to S3, the routine advances to step S4, where the d and f are compared to each other. In the case where f is not less than d, that is, the motor rotation frequency is not less than the lock determination frequency, the routine advances to step S5, where the maximum value (Max.Duty) of the Duty of the motor 1 is calculated according to the following equation. After that, the Max.Duty is set in step S6, and the present routine is ended.

$$\text{Max.Duty} = D0 * Kf \quad \text{(equation 1)}$$

In the above equation, D0 is an allowable Duty value, and Kf is a frequency adjustment coefficient. More specifically, D0 is the maximum value of the Duty that is allowed to be applied to the motor 1 in a locked state (f=0) of the motor 1 in terms of demagnetization of a magnet., current capacity of the switching device, or the like. D0 is a value depending on the power supply voltage E, and the CPU 3 calculates a value of D0 according to the following equation using the power supply voltage E acquired in step S3 as a parameter.

$$D0 = a - bE \qquad \text{(equation 2)}$$

Figure 3:
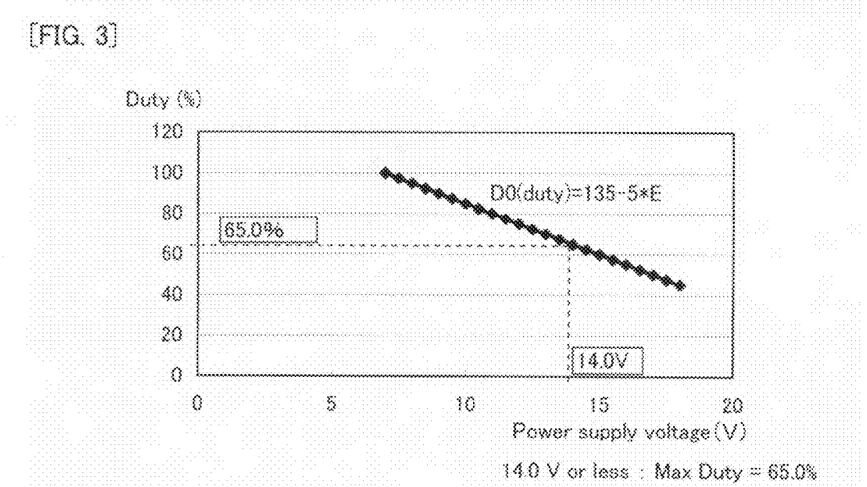
FIG. 3 is a graph showing a relationship between E and D0 in the case where a and b are set to 13.5 and −5, respectively, in the equation 2.

In the above equation 2, a and b are fixed values previously set for each motor (or each motor type), in which a is a fixed Duty value calculated from the allowable current amount at the locked time, and b is a Duty characteristic coefficient determined in accordance with the motor characteristics. These values are previously stored in the ROM 9. FIG. 3 is a graph showing a relationship between E and D0 in the case where a and b are set to 13.5 and −5, respectively, in the above equation 2.

The fixed Duty value a is determined depending on the amperage of a lock current. In the graph of FIG. 3, the fixed Duty value a becomes the intercept value of D0 expressed by a linear function in which E is taken as a variable. The value of a becomes larger as the allowable current increases, that is, the line on the graph of FIG. 3 is moved in the right direction. On the other hand, the value of a becomes smaller as the allowable current decreases, that is, the line on the graph of FIG. 3 is moved in the left direction. Note that, the graph of FIG. 3 (where a is set to 13.5) shows a case where the allowable current value has been set to 30 A.

The Duty characteristic coefficient b is determined based on the characteristics of each motor in accordance with the winding resistance and the like of the motor. In the graph of FIG. 3, the Duty characteristic coefficient b represents the slope of D0 expressed by a linear function in which E is taken as a variable. As described above, the allowable Duty value D0 needs to be reduced to a lower level when the power supply voltage E is high. In this case, b assumes a positive value and, thereby, the graph shows a downward sloping line.

As described above, the allowable Duty value D0 is set in accordance with characteristics of each motor based on the allowable maximum lock current value and is changed depending on the magnitude of the power supply voltage E. In this case, as the allowable maximum lock current value, a value in which demagnetization of a magnet can be suppressed within an allowable range is set. Thus, by forcibly suppressing the Duty value to not more than D0 in accordance with the power supply voltage E when a locked state is detected, an overcurrent in a locked state at low temperature time can be prevented to thereby suppress demagnetization of a magnet.

However, in such a control configuration, even in a state where the number of rotations of the motor is gradually decreased due to overload to thereby increase the winding current value, the Duty value is not forcibly set unless the motor is stopped. To cope with this problem, in the present control method, a countermeasure for preventing the overcurrent is taken in accordance with a state of the motor. That is, the allowable Duty value is corrected in accordance with the motor rotation frequency f, and the maximum Duty value allowed under the motor rotation number obtained at that time is set. For this countermeasure, the coefficient Kf of the equation 1 for adjusting D0 is prepared.

That is, the frequency adjustment coefficient Kf is a coefficient depending on the motor rotation frequency f and is used as an adjustment value for calculating the value of Max.Duty allowed under the current motor rotation frequency f based on D0. The CPU 3 uses the motor rotation frequency f and lock determination frequency d acquired in steps S1 and S2 to calculate Kf according to the following equation.

$$Kf = 1 + (f-d)/c \qquad \text{(equation 3)}$$

In the equation 3, c is a restriction start frequency serving as a fixed value (second reference frequency (which corresponds to a second reference rotation number in relationship with the motor rotation number)) for determining the value (Hz) of the motor rotation frequency at which the restriction of the Duty value is started. The restriction start frequency c is previously stored in the ROM 9. The motor 1 operates at a motor rotation frequency f of 900 Hz or more in general, so that, for example, 860 (Hz) is set as the value of c. Further, f−d becomes 0 at the time when the motor rotation frequency f reaches the lock determination frequency d and, at this time, Kf becomes 1. At this time, the allowable Duty value D0 becomes 1 (×1), that is, D0 itself, so that when f reaches d, the Max.Duty value becomes D0 even if f does not become 0.

Figure 4:
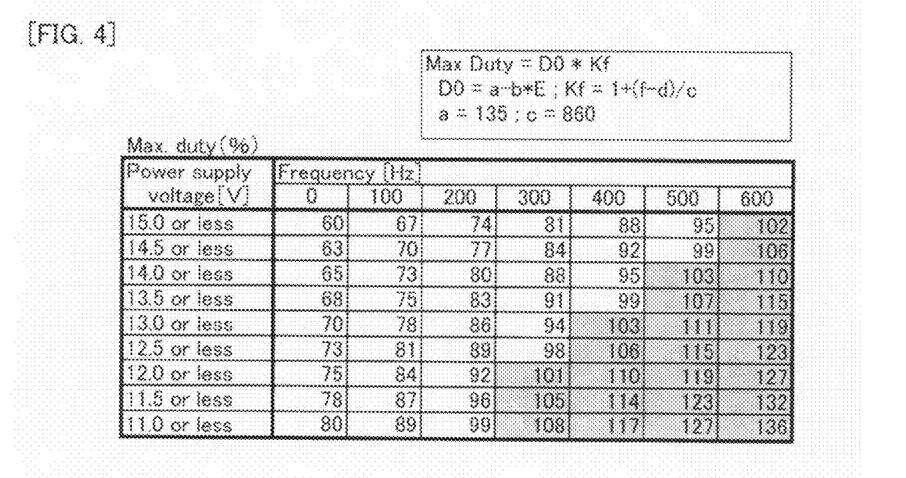
FIG. 4 shows an example of the control map showing a Max.Duty value in the case where a, b, c, and d are set to 13.5, −5, 860, and 0, respectively.

FIG. 4 shows an example of the control map 10 showing the Max.Duty value in the case where a, b, c, and d are set to 13.5, −5, 860, and 0, respectively. The control map 10 as shown in FIG. 4 is stored in the ROM 9. In this case, d is set to 0 (locked state is determined when f becomes 0 Hz), so that when the frequency becomes 0 Hz, D0 set as shown in FIG. 3 is applied. That is, the equation 1 is represented by Max.Duty=D0*(1+ f/860): (equation 4) in the map of FIG. 4, in which when f is 0 Hz, Max.Duty becomes D0. For example, assuming that d is set to 200, the table of FIG. 4 is read such that D0 is applied when f becomes 200.

D0 assumes values as shown in FIG. 3 in accordance with the power supply voltage E. For example, when the power supply voltage E is set within a range from 13.5 V to 14.0 V, D0 becomes 65 (%). That is, in FIG. 4, when E is 14.0 (V) or less and frequency is 0 (Hz), the Max.Duty value becomes 65 (%). This means that in the case where the motor 1 is locked when E is set within a range from 13.5 V to 14.0 V, the maximum value of the Duty is reduced to 65%.

Further, as shown in FIG. 4, in the case where the power supply voltage is set within a range from 13.5 V to 14.0 V as in the above case, the Duty value is restricted such that the when f is 100 Hz, Max.Duty value is reduced to 73%, and when f is 200 Hz, Max.Duty value is reduced to 80%. When f is 500 Hz, the calculated value of the Max.Duty becomes 103 (%). Since 100% is permitted for the Duty value, Duty is not restricted in this case. In the equation 4, when f is 463 Hz, the Max.Duty becomes 100, so that, in the motor 1, when E is set within a range from 13.5 to 14.0 and f becomes less than 463 Hz, the Max.Duty is started to be restricted. In the case where the calculated value of the Max.Duty is 100 (%) or more shown as a shaded region of FIG. 4, the DUTY value is regarded as 100 (%).

By restricting the Max.Duty according to the equation 1, the maximum value of the Duty is gradually restricted along with a decrease in the number of rotations of the motor 1. As a result, at the time of motor lock, the maximum value of the Duty is suppressed to D0 which is a value that takes demagnetization of a magnet, current capacity of a switching device, or the like into consideration. Thus, even if the motor 1 enters in a locked state at low temperature time, it is possible to reduce a lock current flowing to an armature to a predetermined value or less. Therefore, it is possible to suppress demagnetization of a magnet under a low temperature environment and thereby, correspondingly, to reduce the grade of a magnet and to reduce the thickness thereof. As a result, it is possible to use a low cost magnet to thereby reduce apparatus cost as well as to reduce the size and weight of the motor.

Further, an excessive lock current does not flow to a control circuit or drive circuit, so that it is possible to prevent an excessive load from being applied to a switching device used there. This eliminates the need to use an expensive switching device having high current capacity which has conventionally been used, making it possible to use a low cost switching device having low current capacity. Therefore, it is possible to reduce circuit cost as well as to reduce a space for mounting a circuit component and calorific power generated in a circuit.

In the case where the motor rotation frequency f is less than the lock determination frequency d in step S4, the routine advances to step S7. In this case, it is determined that the motor 1 has been in a locked state, so that the Max.Duty is set to the abovementioned D0, and the routine advances to step S6 to terminate the present routine. As a result, even if the motor 1 enters a locked state immediately after its activation, the Max.Duty is suppressed to D0, thereby preventing demagnetization of a magnet and overload of a switching device.

Second Embodiment

Next, as a second embodiment of the present invention, a control configuration that takes the temperature of a motor into consideration will be described. The control configuration of the second embodiment is represented by multiplying the equation 1 of the first embodiment by a coefficient Kt which depends on the motor temperature, and the Max.Duty is calculated according to the following equation. Note that, in the following embodiments, the same reference symbols as those in the first embodiment denote the same coefficients and the like as in the first embodiment, and the descriptions thereof will be omitted.

$$\text{Max.Duty} = D0 * Kf * Kt \quad \text{(equation 5)}$$

The control method according to the present invention is mainly applied as a countermeasure against demagnetization of a magnet under a low temperature environment and, in the case where the motor temperature is high, the Max.Duty can be made larger than D0*Kf. Thus, in the control method of the second embodiment, temperature correction of the Max.Duty value is made by multiplying the equation 1 by a temperature correction coefficient Kt which becomes larger along with an increase in the motor temperature. The temperature correction coefficient Kt is represented by the following equation.

$$Kt = g + hj \quad \text{(equation 6)}$$

Figure 5:
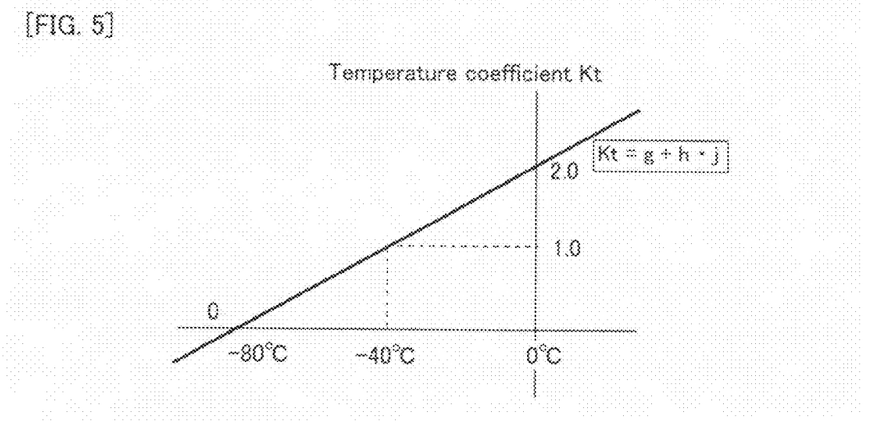
FIG. 5 is an explanatory view showing a relationship between motor temperature and temperature correction coefficient Kt.

The equation 6 is expressed by a linear function in which motor temperature j is taken as a variable and is represented as shown in FIG. 5. In the equation 6, h is a temperature coefficient which indicates a change amount of Kt relative to the motor temperature j. The temperature coefficient h represents the slope of the Kt line in the graph of FIG. 5. For example, 0.025 is set as h. Further, g is a temperature base value. For example, a value that makes Max.Duty=0, that is, Kt=0 is set as g in the case where normal operation of a motor cannot be assured due to extremely low temperature (e.g., −80° C.). This temperature base value g becomes the intercept value of the Kt line in the graph of FIG. 5. Assuming that Kt is 0 at −80° C. when h is 0.025, g becomes 2.

The graph of FIG. 5 shows a line obtained in the case where the temperature correction coefficient Kt is set to 2+0.025j. Assuming that the reference temperature to which the table of FIG. 4 is applied is set to −40° C. (j=−40), the temperature correction coefficient Kt becomes 1. That is, when the motor temperature is −40° C., Max.Duty=D0*Kf is satisfied as in the case of the first embodiment. On the other hand, when the motor temperature reaches 0° C., Kt becomes 2, and Max.Duty=2D0*Kf is satisfied. When the motor temperature exceeds 0° C., the suppression of the Duty value performed according to the present control method is canceled.

As described above, the control method according to the second embodiment is achieved by taking into account the temperature correction, so that it is possible to suppress the Duty value in accordance with the actual condition of the motor temperature. Therefore, the drive control of the motor can be performed more effectively to thereby further optimize the motor characteristics and circuit condition. Although the motor temperature is used to perform the temperature correction in the second embodiment, the temperature of any other site or component (e.g., switching device or magnet) may be detected for the temperature correction.

Third Embodiment

The abovementioned control configuration is employed to prevent demagnetization of a magnet due to an overcurrent at the time of motor lock. From this viewpoint, it is unnecessary to suppress the Duty value in the case where the motor rotation frequency f is gradually increased like 0, 200, and 400, during acceleration of the motor. If the Duty value is suppressed in such a case, acceleration slows down to prevent smooth motor operation by contrast. In light of the above, the control method of the third embodiment determines whether to apply the control depending on acceleration/deceleration condition of the motor and suppresses the Duty value only when it is necessary.

Figure 6:
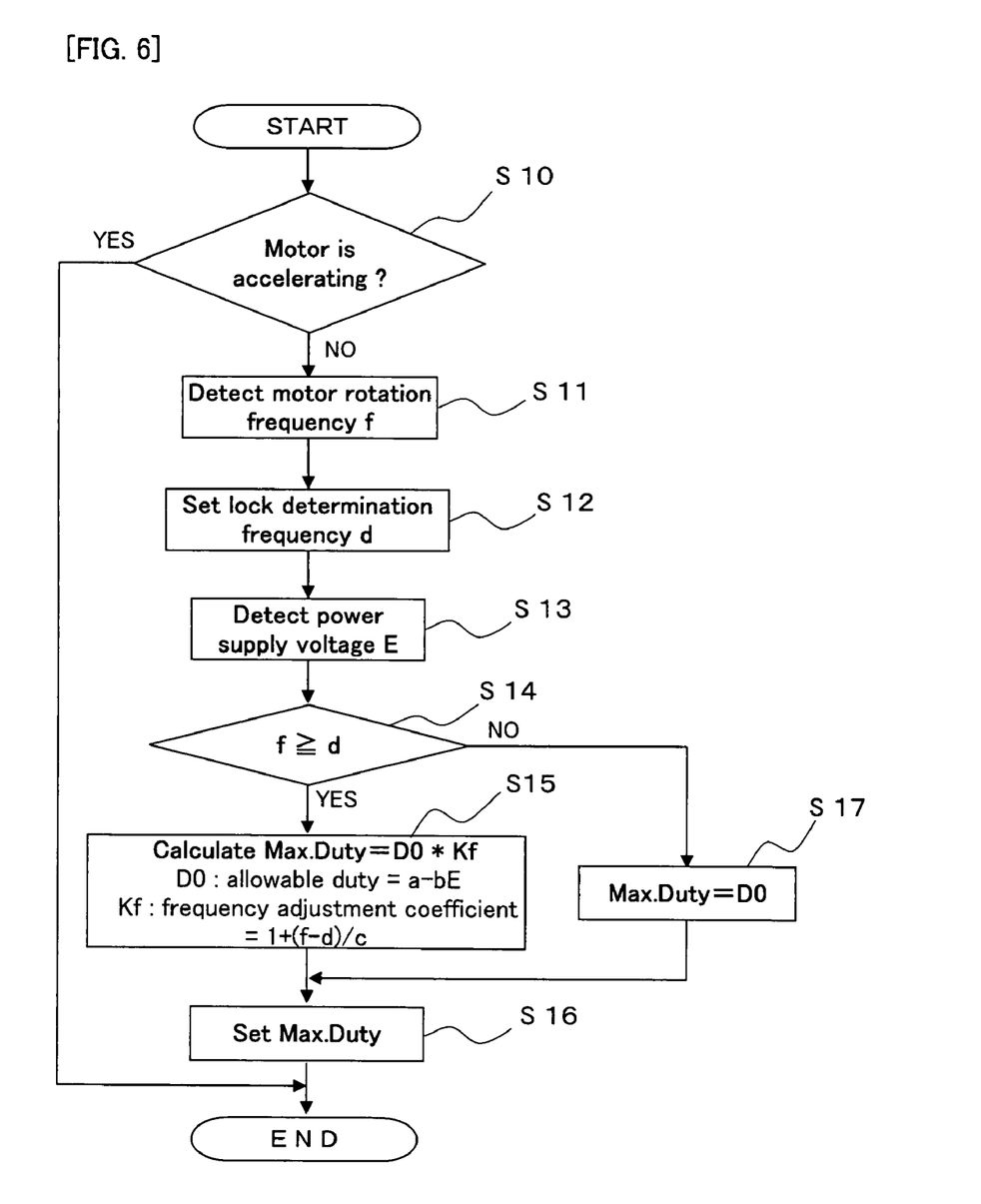
FIG. 6 is a flowchart showing the processing procedure of the motor drive control according to the third embodiment of the present invention.

FIG. 6 is a flowchart showing the processing procedure of the motor drive control according to the third embodiment of the present invention. After the start of the control processing of FIG. 6, it is determined in step S10 that the motor 1 is accelerating or not. Whether the motor 1 is accelerating or not is determined by an increase or decrease in the motor rotation frequency f. When the current f data is greater than the f data immediately before the current one, it is determined that the motor 1 is accelerating.

In the case where the motor 1 is accelerating, the suppression of the Duty value is determined to be unnecessary, and this routine is ended. By determining the acceleration/deceleration condition of the motor ahead of the suppression processing of the Duty value in this manner, the Duty value is not suppressed during acceleration of the motor with the result that smooth acceleration operation can be attained. On the other hand, in the case where the motor 1 is not accelerating, that is, in a state where the motor speed is not changed or is decreased, the routine advances to step S11 where the suppression processing of the Duty value is performed. The processing of step S11 and subsequent steps are the same as those shown in FIG. 2 of the first embodiment.

It goes without saying that the present invention is not limited to the above embodiments, and various modification may be made within the scope of the subject matter of the invention.

For example, although the present invention is applied to a wiper system motor provided in a vehicle in the above embodiments, the application target of the present invention is not limited to this, but the present invention is applicable to various types of motors such as one that drives a window or door, another in-vehicle motor, or one that is used in a pump employed in a cold region. Further, the numerical values or table of FIG. 3 shown in the above embodiments are merely an example, and the present invention is not limited to these numerical values.

The invention claimed is:

1. A motor control method that applies a voltage having a pulse-like waveform including on-time and off-time and changes on/off time ratio of the voltage to change an actual applied voltage, characterized by comprising:

setting, based on the allowable current amount of the motor, an allowable Duty value representing the maximum value of on-time ratio of the voltage that can be applied to the motor when the motor enters in a locked state with a power supply voltage set as a variable;

detecting the number of rotations of the motor and power supply voltage; and suppressing, based on the detected power supply voltage, the on-time ratio of the applied voltage to not more than the allowable Duty value when the number of rotations of the motor becomes not more than a first reference value.

2. The motor control method according to claim 1, characterized by comprising, when the number of rotations of the motor has exceeded the first reference value, correcting the allowable Duty value based on the number of rotations of the motor and suppressing the on-time ratio of the applied voltage to not more than the corrected allowable Duty value based on the detected power supply voltage.

3. The motor control method according to claim 2, characterized in that the correction of the allowable Duty value based on the number of rotations of the motor is executed when the number of rotations of the motor becomes not more than a second reference value.

4. The motor control method according to claim 1, characterized by comprising detecting the temperature or ambient temperature of the motor and correcting the allowable Duty value based on a detected temperature value.

5. The motor control method according to claim 1, characterized in that the suppression of the on-time ratio of the applied voltage is not executed during acceleration of the motor.

6. A motor control system that applies a voltage having a pulse-like waveform including on-time and off-time and changes on/off time ratio of the voltage to change an actual applied voltage for motor drive control, characterized by comprising:

rotation number detecting means for outputting a pulse signal in synchronization with the rotation of the motor;

a voltage sensor for detecting a power supply voltage;

storage means for storing an allowable Duty value, the allowable Duty value being set based on the allowable current amount of the motor with a power supply voltage set as a variable and representing the maximum value of on-time ratio of the voltage that can be applied to the motor when the motor enters in a locked state; and current restricting means for suppressing, based on the detected power supply voltage, the on-time ratio of the applied voltage to not more than the allowable Duty value when the frequency of the pulse signal becomes not more than a first reference frequency.

7. The motor control method according to claim 3, characterized by comprising detecting the temperature or ambient temperature of the motor and correcting the allowable Duty value based on a detected temperature value.

8. The motor control method according to claim 2, characterized in that the suppression of the on-time ratio of the applied voltage is not executed during acceleration of the motor.

9. The motor control method according to claim 3, characterized in that the suppression of the on-time ratio of the applied voltage is not executed during acceleration of the motor.

10. The motor control method according to claim 4, characterized in that the suppression of the on-time ratio of the applied voltage is not executed during acceleration of the motor.

11. The motor control method according to claim 2, characterized by comprising detecting the temperature or ambient temperature of the motor and correcting the allowable Duty value based on a detected temperature value.

12. The motor control method according to claim 7, characterized in that the suppression of the on-time ratio of the applied voltage is not executed during acceleration of the motor.

13. The motor control system according to claim 6, characterized by further comprising a temperature sensor that detects the temperature or ambient temperature of the motor, wherein the current restricting means corrects the allowable Duty value based on a detected temperature value.

14. The motor control method according to claim 11, characterized in that the suppression of the on-time ratio of the applied voltage is not executed during acceleration of the motor.

* * * * *